UNITED STATES PATENT OFFICE.

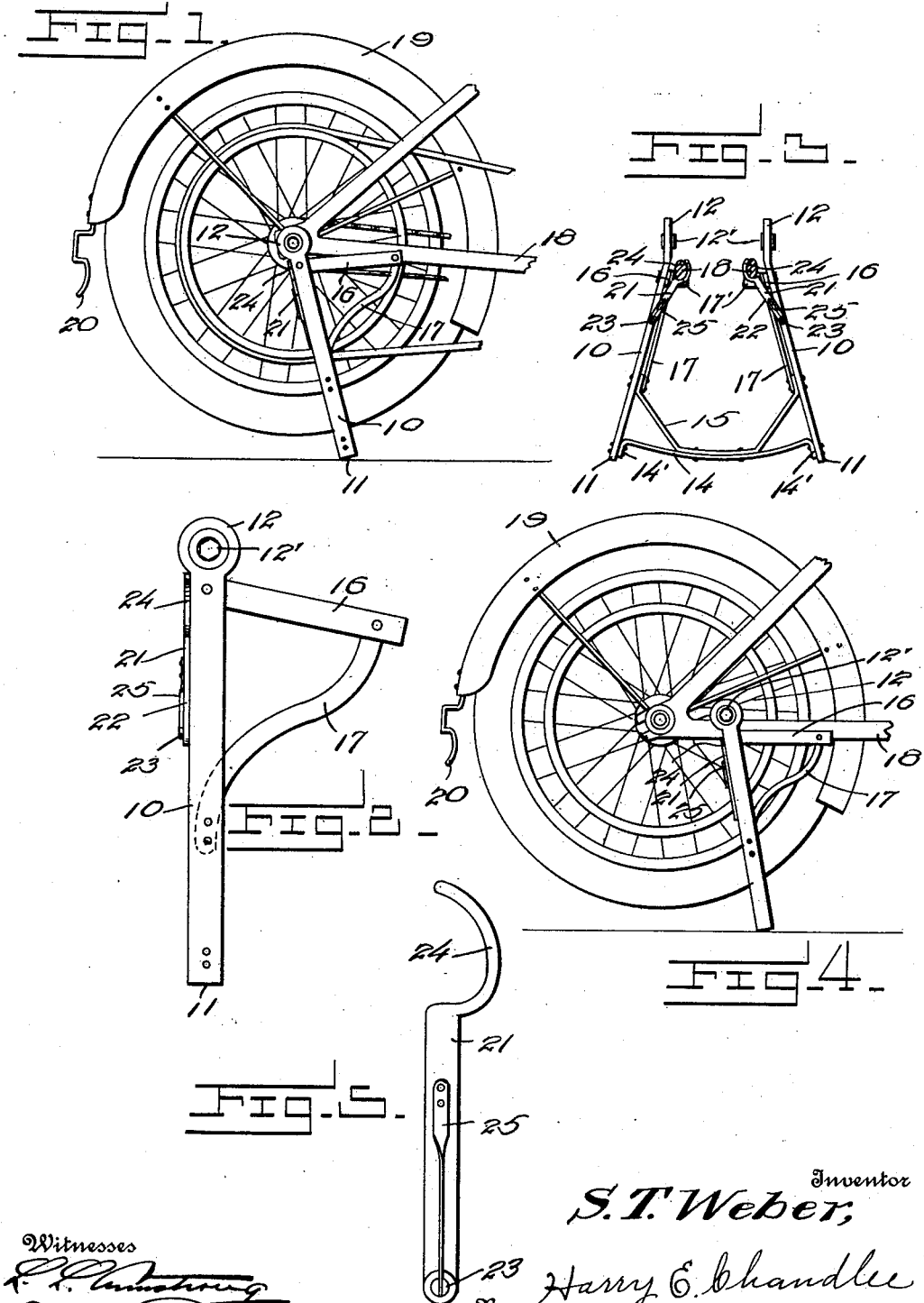

STEPHEN TAKAIS WEBER, OF PEORIA, ILLINOIS.

MOTOR-CYCLE STAND.

998,219.  Specification of Letters Patent.  Patented July 18, 1911.

Application filed January 12, 1911. Serial No. 602,295.

*To all whom it may concern:*

Be it known that I, STEPHEN T. WEBER, a citizen of the United States, residing at Peoria, in the county of Peoria and State of Illinois, have invented certain new and useful Improvements in Motor-Cycle Stands, of which the following is a specification.

This invention relates to stands for motor cycles.

The primary object of the invention is to provide a device of this character which is simple in construction and which may be conveniently supported and carried by the vehicle when the same is not in use.

A further object is to so construct the device that the same will support the vehicle at a point adjacent the axle of the rear wheel, the construction being such that the rear wheel may be removed for the purpose of repair.

Other objects and advantages will be apparent from the following description, and it will be understood that changes in the specific structure shown and described may be made within the scope of the claims, without departing from the spirit of the invention.

In the drawings: Figure 1 is a side elevation of the device in its applied position, Fig. 2 a view of the same removed, Fig. 3 an end view, Fig. 4 a view showing the device so positioned on the frame that the rear wheel may be removed, and Fig. 5 a detail view of the pivoted latch member.

In the drawings: 10 designates struts, the end portions of which form the feet 11, their other ends terminating in the off sets 12 which are provided with apertures 12' which are so formed as to engage the nuts which are carried by the rear axle of the vehicle. The struts 10 are connected at their base portions by the bowed member 14 which is substantially U-shaped, its off set end portions 14' tending to force the end portions of the struts apart. A second connecting member 15 which is also substantially U-shaped and which is formed of resilient material, has its end portions connected to the struts at points intermediate their ends, the central portion of the member 15 being secured to the connecting member 14, the two members 14 and 15 forming resilient means for holding the end portions of the struts in spaced relation. Arms 16 are rigidly connected to the members 10, said arms being braced by the arms 17 whose end portions are likewise connected to the struts. The arms 16 are provided with hooks 17' which, when the device is in its supporting position, engage the bar 18 of the frame of the vehicle.

The mud guard 19 which is of resilient material is provided with the spring catch 20, which holds the stand when the same is not in use.

In ordinary usage, the device is positioned as shown in Fig. 1, but when it is desired to remove the rear wheel, which necessitates the removal of the rear axle, the off sets are disengaged from said axle and the stand moved forward on the bar 18. In order to hold the device in this position, the struts 10 are provided with latch members 21, said latch members being formed with a shank portion 22 which is pivotally supported by the member 23, said member being rigidly secured to the member 10. The shank 22 terminates in the engaging loop 24, which when the device is in the position shown in Fig. 4, embraces the bar 18. A spring 25 is secured to the shank 22, the end portion of said spring entering a slot formed in the member 23, the tendency of said spring being to hold the loop 24 in engagement with the bar 18. It will be seen that when the device is positioned on the vehicle as shown in Fig. 4, the rear wheel may be removed for the purpose of repair.

The many advantages of a device constructed in this manner will be clearly apparent, as the same will not only be efficient in practice but economical to manufacture.

Particular attention is called to the peculiar construction of the latch members, which are pivotally supported by said struts.

What is claimed is:

1. A motor cycle stand, comprising supporting struts, brace members connecting the struts on opposite sides of the motor cycle, forwardly projecting brace arms for engaging the frame of the motor cycle, and spring pressed hook members pivotally secured to the struts for engaging the rear portion of the frame to secure the stand to the motor cycle frame.

2. A motor cycle stand, comprising supporting struts, arms secured to said struts and provided with hook portions for engaging the motor cycle frame, hook members pivoted to the struts, and blade spring members having one end secured to the hooks and the other end secured to the struts for forcing the hooks toward the struts to lock the motor cycle frame between the hooks and struts.

3. A motor cycle stand, comprising supporting struts, brace members connecting the lower end of said struts, axle engaging bushings pivotally secured to the upper ends of the struts, frame engaging arms projecting forwardly from and secured to the struts, and resilient supplemental engaging members for clampingly engaging the frame when the axle engaging bushings are in inoperative position.

In testimony whereof I affix my signature, in the presence of two witnesses.

STEPHEN TAKAIS WEBER.

Witnesses:
 JOHN SZENTES,
 SZAVOR MEKSITY.

Copies of this patent may be obtained for five cents each, by addressing the "Commissioner of Patents, Washington, D. C."